No. 742,304. PATENTED OCT. 27, 1903.
J. A. FRANCIS.
FLY OR INSECT TRAP.
APPLICATION FILED JAN. 26, 1901. RENEWED SEPT. 4, 1903.
NO MODEL.
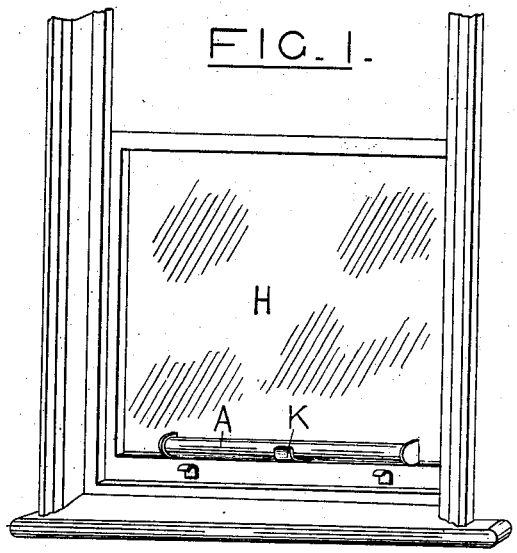
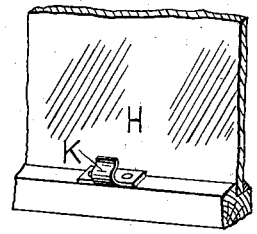
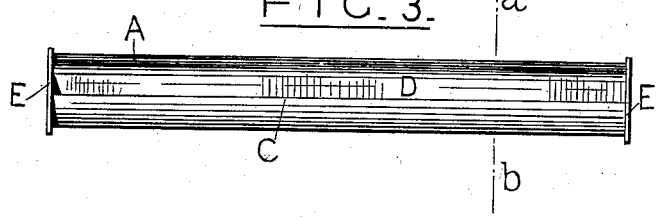
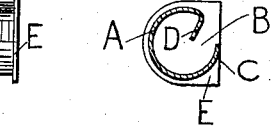
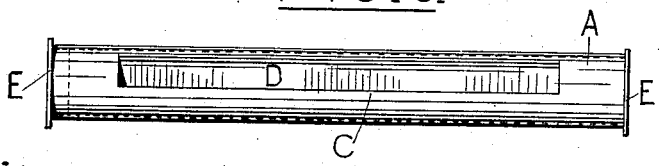
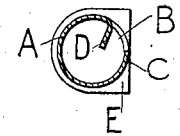

No. 742,304. Patented October 27, 1903.

UNITED STATES PATENT OFFICE.

JOSEPH ADDISON FRANCIS, OF NORWOOD, SOUTH AUSTRALIA, AUSTRALIA.

FLY OR INSECT-TRAP.

SPECIFICATION forming part of Letters Patent No. 742,304, dated October 27, 1903.

Application filed January 26, 1901. Renewed September 4, 1903. Serial No. 171,925. (No model.)

*To all whom it may concern:*

Be it known that I, JOSEPH ADDISON FRANCIS, irrigation engineer, a subject of the Queen of Great Britain and Ireland, and a resident of 20 Charles street, Norwood, in the State of South Australia, Australia, have invented a certain new and Improved Buzz-Fly or Insect Trap, of which the following is a specification.

This invention is designed for the capture and destruction of flies and other insects.

It consists in a specially-designed trough or open or partly-open tube made of metal, paper, or other suitable material and of such a sectional form that when fixed in position, preferably against a window-pane, insects or flies can readily enter the trough, but owing to its construction cannot easily escape therefrom.

In the accompanying drawings, Figure 1 shows a portion of a window with my trap in position. Fig. 2 shows a clip for holding the trap in place. Fig. 3 is a side view of the trap, showing the side which is in contact with the window. Fig. 4 is a vertical cross-section on line $a\,b$ of Fig. 3. Figs. 5 and 6 are side view and vertical cross-section, respectively, of a modified construction of my trap.

My specially-designed trough is formed of a tube A, with a slot or opening B along the whole or part of its length, and one edge C of the tube when the appliance is in position impinges horizontally against a transparent vertical surface, such as, preferably, a window-pane H. The plate A, forming the trough, curves downward from this edge C, then upward and over till the other edge D forms the other boundary of the longitudinal opening, parallel to but a slight distance from the pane. This upper edge D is preferably somewhat curved inward, forming a baffle which effectually prevents the flies or insects escaping. The ends of the tube portion are closed by suitable caps E, having a perpendicular edge to hold the tube in correct position against the pane H. When the opening B extends for only a portion of the length of the tube, as in Figs. 5 and 6, one of the caps E is made to slide into the end, so as to be removable for cleaning. In this case the edge C as well as the edge D may be curved inward. It is necessary that the trough should be fixed against the window in such a manner that the lower edge of the opening impinges against the glass and that the trough can be lifted out and replaced. This attachment and removal can be provided for by various means, such as clips, pins, struts, or buttons. I have found the best method to be a clip such as that shown in Fig. 2.

Although a curved shape such as above described is what I have so far found best, the trough may be formed of oval, three-cornered, or other shape, provided the essential feature of the opening next the pane is embodied as and for the purpose set forth.

My trap is preferably used in conjunction with some destructive powder or sticky or enticing or other material, such as those in common use. Instead, however, of being spread about, the "buzz" powder or poison powder or other material is by this trough concentrated in one continuous streak all along the bottom of the trough, so that its properties operate effectively upon the flies or other insects immediately they enter and cause death or stupefaction. Consequently my appliance is very effective with the use of only a very small quantity of powder or other material.

Another advantage of this appliance is that the flies are all collected together and can be emptied out and the trough cleansed with great facility.

The trough may be used without any powder or material, in which case the slot-opening would be made smaller than when such materials are used.

Having described my invention, what I claim as new, and desire to secure by Letters Patent, is—

1. In a fly-trap, the combination of a tube presenting an edge adapted to impinge against a window-pane, a partially-covered trough and a downwardly-projected baffle spaced slightly away from said edge to form a slot between said edge and the pane, and said baffle, caps adapted to close the ends of said tube, said caps presenting an edge on the same vertical plane as said edge whereby the latter is held in the proper position relative to said pane, and means whereby said trap is sustained in such position.

2. In a fly-trap, the combination of a tube presenting an edge adapted to impinge against a window-pane, a partially-covered trough and a downwardly-projected baffle spaced slightly away from said edge to form a slot between said edge and the pane, and said baffle, and removable caps adapted to close the ends of said tube, said caps presenting an edge on the same vertical plane as said edge whereby said edge is held in the proper position relative to said pane, and means whereby said trap is sustained in such relation.

3. In a fly-trap, the combination of a tube presenting an edge adapted to impinge against a window-pane, a partially-covered trough and a downwardly-projected baffle spaced slightly away from said edge to form a slot between said edge and the pane, and said baffle, caps adapted to close the ends of said tube, said caps presenting an edge on the same vertical plane as said edge whereby the latter is held in the proper position relative to said pane and a clip adapted to be secured to the frame and to sustain said tube in such position.

In testimony that I claim the foregoing as my invention I have signed my name, in the presence of two witnesses, this 29th day of November, 1900.

JOSEPH ADDISON FRANCIS.

Witnesses:
CHARLES NICHOLAS COLLISON,
WILLIAM SPEAKMAN HANSON.